US012733648B2

(12) United States Patent
Van Blokland

(10) Patent No.: US 12,733,648 B2
(45) Date of Patent: Sep. 15, 2026

(54) DEVICE FOR ROLLING DOUGH ON A SURFACE

(71) Applicant: Radie B.V., Culemborg (NL)

(72) Inventor: Johannes Josephus Antonius Van Blokland, Culemborg (NL)

(73) Assignee: Radie B.V., Culemborg (NL)

( * ) Notice: Subject to any disclaimer, the term of this patent is extended or adjusted under 35 U.S.C. 154(b) by 75 days.

(21) Appl. No.: 18/913,522

(22) Filed: Oct. 11, 2024

(65) Prior Publication Data

US 2025/0120407 A1 Apr. 17, 2025

(30) Foreign Application Priority Data

Oct. 13, 2023 (NL) ...................................... 2036023
Dec. 12, 2023 (NL) ...................................... 2036494

(51) Int. Cl.
*A21C 3/02* (2006.01)

(52) U.S. Cl.
CPC .................................... *A21C 3/024* (2013.01)

(58) Field of Classification Search
None
See application file for complete search history.

(56) References Cited

U.S. PATENT DOCUMENTS 4,631,017 A 12/1986 Hayashi
4,671,760 A 6/1987 Hayashi
6,082,988 A 7/2000 Muller
7,205,017 B2 4/2007 Machinery
12,329,166 B2 6/2025 Hoos et al.
2023/0086905 A1* 3/2023 Hoos ...................... A21C 3/027 425/365

FOREIGN PATENT DOCUMENTS

EP 4154716 A1 3/2023

OTHER PUBLICATIONS

European Communication (extended European search report) dated Feb. 6, 2025 (Application No. 24203050.0).

* cited by examiner

*Primary Examiner* — Yung-Sheng M Tsui
*Assistant Examiner* — Melody Tsui
(74) *Attorney, Agent, or Firm* — The Dobrusin Law Firm, P.C.

(57) ABSTRACT

Device for rolling dough on a surface, such as a plate, roller or conveyor belt, comprising:

Figures 1, 1A:
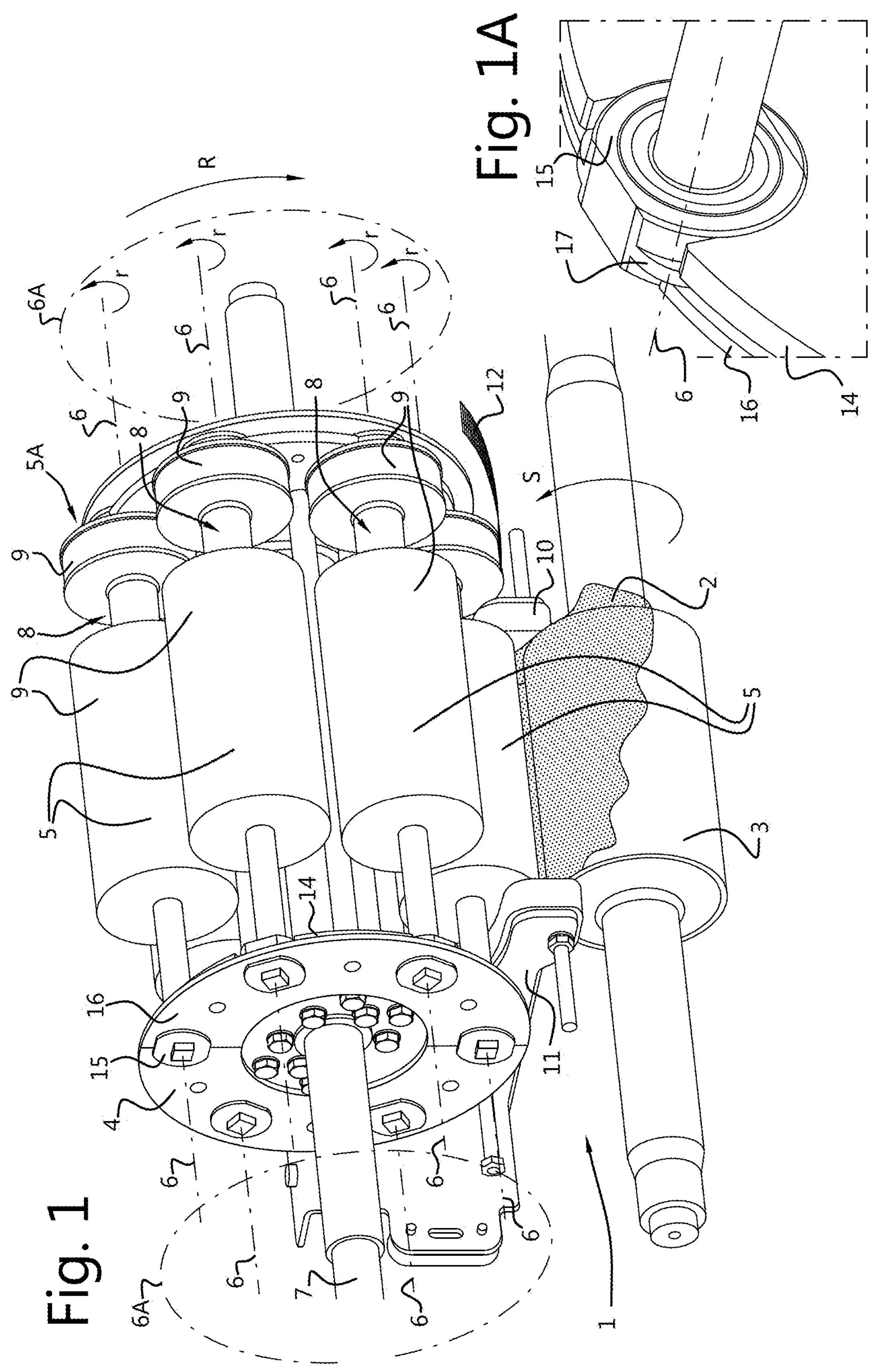

a carousel comprising a number of rollers, each of which is rotatable around mutually parallel roller rotation axes, all of said axes intersecting an imaginary circle and are jointly rotatable around a carousel rotation axis through the centre of said circle, which carousel rotation axis is parallel to at least that part of the surface intended for rolling the dough;

wherein the dough rollers are cylindrical and each has at least one same end with a slot in their jacket, configured for at least partially accommodating a barrier during rotation of the carousel around the carousel rotation axis.

9 Claims, 2 Drawing Sheets

DEVICE FOR ROLLING DOUGH ON A SURFACE

The present invention relates to a device for rolling dough on a surface. In particular, the invention relates to a device comprising a number of dough rollers arranged in a carrousel. Devices of this kind are referred to in the art as "quick reductor" or "quick reducer" or "multiroller" and serve as means for reducing the thickness of a dough piece, in particular an (endless) dough sheet. The devices are usually positioned at the beginning of a dough line, and serve as one of the first thickness reduction steps, after a funnel. When the dough is transported through the device as a sheet, it is in most cases desired not to widen the sheet or within set boundaries, but only to reduce its thickness.

Since this first thickness reduction step is normally a relatively large reduction of the thickness, one of the problems that may occur at this step is squeezing dough in the width direction. European patent application EP4154716 recognises this problem, but suggests a solution that comprises several disadvantages. One of those is that the cleaning of the device is cumbersome, due to its construction. Another disadvantage is that the device is likely to tear the dough to be rolled.

It is a goal of the present invention to provide an alternative to the prior art solutions, that takes away at least part of the disadvantages mentioned, and/or that provides a useful alternative to the prior art.

The invention thereto proposes a device for rolling dough on a surface, such as a plate, roller, or conveyor belt, comprising:

a carousel comprising a number of rollers, each of which is rotatable around mutually parallel roller rotation axes, all of said axes intersecting an imaginary circle and are jointly rotatable around a carousel rotation axis through the centre of said circle, which carousel rotation axis is parallel to at least that part of the surface intended for rolling the dough;

wherein the dough rollers are cylindrical and each has at least one same end with a slot in their jacket, configured for at least partially accommodating a barrier during rotation of the carousel around the carousel rotation axis.

Accommodating such barrier in a slot in the dough roller helps blocking dough to follow unintended paths. In particular it assures that the spreading of dough is limited as closely to an effective and intended rolling surface of the roller as possible. This also allows to easily clean the device. Preferably the barrier is positioned fixed to the surface. Herewith a barrier with a fixed position is meant in particular, and more in particular a barrier that is not moving (such as rotating). A moving barrier has the disadvantage that it may cause the dough to spread through the device, while a fixed position avoids this. Preferably such barrier also extends over a length at least 1.5 and more preferably at least twice the diameter of a dough roller, to limit space to move in direction of the axis of rotation of said roller for the dough being pushed forward by the roller. It may be separately removable for cleaning. The carrousel or its rollers may also be separately removable for this purpose, or altogether with the barrier or barriers (as will be explained further on). It has appeared that the width of the rolled dough is a lot more constant when these fixed barriers, extending over some length, are applied.

In a preferred embodiment, a circle-segment-shaped friction plate is provided that touches a part of the dough rollers located between the slot and the end of the roller during rotation of the carousel, in order to bring the dough rollers into rotation around their respective roller rotation axis when the carousel rotates. Actively rotating the rollers, that is: not being moved due to friction with dough, avoids tearing the dough by the rollers. The circle segments according to the invention have a radius and position selected such that they just touch the jacket of the roller beyond the slot.

The jacket of the dough rollers may for instance have an equal diameter on either side of the slot. Then the speed of the jacket is exactly 0 m/s at the position where it touches the dough. However, when the dough is on a roller or a conveyor and being moved when rolled, another diameter may be selected, so that the speed of the jacket equals the speed of the dough, to avoid tearing the dough.

In yet a further preferred embodiment, the dough rollers are provided with a slot in their jacket at both ends, configured for accommodating a barrier such as a barrier positioned relative to the surface during rotation of the carousel around the carousel rotation axis, and wherein the device comprises two such barriers. Such configuration assures that the dough is enclosed at both sides.

The device may further comprise two circle segment-shaped friction plates, arranged in such a way that each contacts a part of the dough rollers located between the slot and the end of the roller at opposite sides during rotation of the carousel, so as to bring the rollers into rotation about their respective roller rotation axis. By driving the rollers at both ends, the device is less sensitive for sticky dough types. Furthermore it is thinkable that the jacket of the dough rollers has a different diameter on both ends, outside of the slots. This can be used in combination with a removable circle segment-shaped friction plate, in order to select to drive the roller on one side of choice, or with circle segment-shaped friction plates at both sides, that extend over different angular positions, to drive the rollers at different speeds depending on their actual position on the carousel.

The rotation axes of the dough rollers may comprise a cross-, disc-, ring- or star-shaped carrier on which the dough roller is fixed, at one or both sides. Such carrier or carriers, viewed from the centre of a roller, are to be located beyond or outside the at least one barrier or beyond or outside the barriers. The rotation axes may be accommodated on the carrier by means of a bearing, and there may be a locking plate on the outside of the bearing that retains the bearings, and that can be removed to easily allow removal of a roller, for instance for cleaning purposes.

Figure 2:
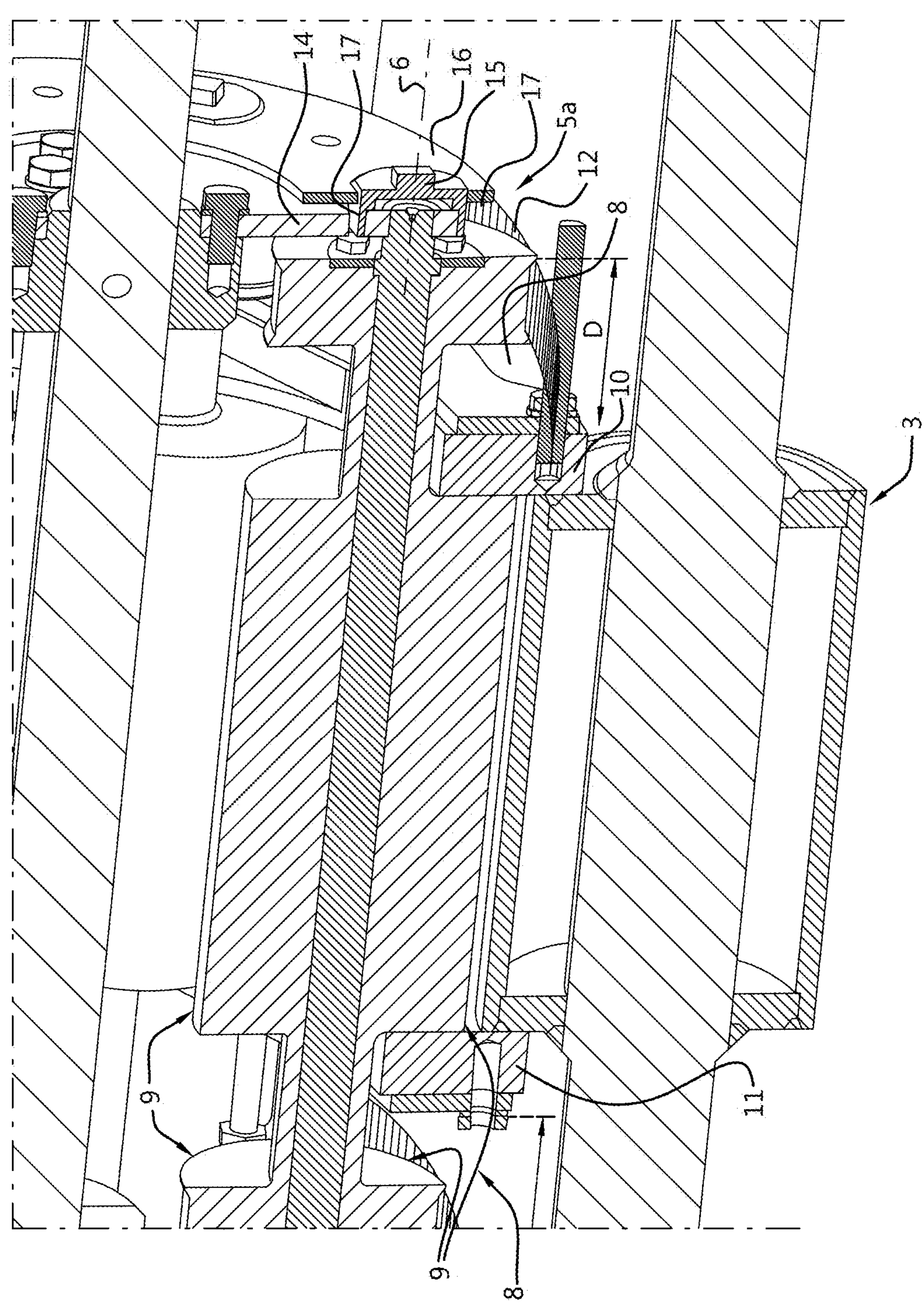

The invention will be elucidated into more detail with reference to the following figures. Herein:

FIG. 1 shows a first perspective view of a device according to the invention; and FIG. 2 shows a second perspective view of a device according to the invention.

FIG. 1 shows a device 1 for rolling dough 2 on a surface 3, in this case formed by a roller 3 but this may according to the invention also be a plate or conveyor belt, the device comprising a carousel 4 comprising a number of rollers 5, each of which is rotatable around mutually parallel roller rotation axes 6, all of said axes intersecting an imaginary circle 6A and are jointly rotatable around a carousel rotation axis 7 through the centre of said circle 6A, which carousel rotation axis 7 is parallel to at least that part of the surface 3 intended for rolling the dough 2 wherein the dough rollers 5 are cylindrical and each has at least one same end with a slot 8 in their jacket 9, configured for at least partially accommodating a barrier 10 during rotation of the carousel 4 around the carousel rotation axis.

The barrier 10 is located at a fixed position relative to the carousel 4 rotation axis 7 and/or the surface 3 and the carousel 4 is rotatable relative to the barrier 10. A second barrier 11 is shown as well, but in this embodiment it is not received in a slot. It still limits the flow of dough 2.

The device further comprises a a circle-segment-shaped friction plate 12 that touches a part of the dough rollers 5, in particular their jacket 9, located between the slot 8 and the end of the roller 5A during rotation of the carousel 4, in order to bring the dough rollers 5 into rotation r around their respective roller rotation axis 6 when the carousel 7 rotates R around its rotation axis 7.

The jacket 9 of the dough rollers 5 has an equal diameter on either side of the slot 8 in the embodiment shown. Depending on the turning direction of the carousel with respect to the support, a larger diameter may be applied in order to let them rotate less turns per turn of the carousel 4 or a smaller diameter to let them rotate more turns per turn of the carousel when the surface 3 is moved in the direction S. The same may be applied when the surface is a conveyor belt moving the dough 2.

FIG. 2 shows an embodiment 20, wherein the dough rollers are provided with a slot 8 in their jacket 9 at both ends 5A, 5B, configured for accommodating a second barrier 12 as well. The embodiment 20 comprises two circle segment-shaped friction plates 12, 13 arranged in such a way that each contacts a part 5A, 5B of the dough rollers located between the slot and the end of the roller at opposite sides during rotation of the carousel 4, so as to bring the rollers 5 into rotation about their respective roller rotation axis 6. The rotation axes 6 of the dough rollers 5 cross a disc shaped carrier 14 on which the dough roller is fixed. The carriers 14, viewed from the centre of a roller, are located at a distance D beyond the at least one barriers 10, 11. The rotation axes 6 are accommodated on the carrier 14 by means of a bearing 15, and there is a locking plate 16 on the outside of the bearing 15 that retains the bearings 15, as visible in detail A in FIG. 1. They may be provided with a flange 17, so that for removal of a roller, only locking plate 17 needs to be removed.

The invention claimed is:

1. Device configured for rolling dough on a surface selected from the group consisting of a plate, roller or conveyor belt, comprising:

a carousel comprising two or more rollers, each roller configured to be rotated around mutually parallel roller rotation axes, all of said axes intersecting an imaginary circle and jointly rotatable around a carousel rotation axis through the centre of said circle, the carousel rotation axis is parallel to at least that part of the surface intended for rolling the dough; and a barrier located at a fixed position relative to the carousel rotation axis and/or the surface and wherein the carousel is rotatable relative to the barrier, and forms a boundary of the surface configured to keep dough on the surfaces of the rollers, wherein the dough rollers are cylindrical and each has a jacket and at least one same end with a slot in the jacket, configured for at least partially accommodating the barrier during rotation of the carousel around the carousel rotation axis.

2. Device according to claim 1, wherein a circle-segment-shaped friction plate is provided, that touches a part of the dough rollers located between the slot and the end of the roller during rotation of the carousel, in order to bring the dough rollers into rotation around their respective roller rotation axis when the carousel rotates.

3. Device according to claim 2, wherein the jacket of the dough rollers has an equal diameter on either side of the slot.

4. Device according to claim 1, wherein the dough rollers are provided with a slot in their jacket at both ends, configured for accommodating a barrier, and wherein the device comprises two barriers.

5. Device according to claim 1, comprising two circle segment-shaped friction plates, arranged in such a way that each contacts a part of the dough rollers located between the slot and the end of the roller at opposite sides during rotation of the carousel, so as to bring the rollers into rotation about their respective roller rotation axis.

6. Device according to claim 1, wherein the rotation axes of the dough rollers cross a disc-, ring- or star-shaped carrier on which the dough roller is fixed, at one or both sides.

7. Device according to claim 6, wherein the carrier or carriers, viewed from the centre of a roller, are located beyond or outside the at least one barrier or beyond or outside the barriers.

8. Device according to claim 7, wherein the at least one barrier can be removed separately for cleaning the device.

9. Device according to claim 1, wherein the rotation axes are accommodated on the carrier by means of a bearing, and wherein there is a locking plate on the outside of the bearing that retains the bearings.

* * * * *